United States Patent [19]

Kojima et al.

[11] Patent Number: 5,138,522
[45] Date of Patent: Aug. 11, 1992

[54] CABINET FOR HOUSING ELECTRICAL COMPONENTS

[75] Inventors: Yasushi Kojima, Kawasaki; Misao Kikuchi, Zama; Akihiro Yakuwa, Asahikawa; Katsuki Matsunaga, Yokohama; Naoya Yamazaki, Kawasaki, all of Japan

[73] Assignee: Fujitsu Limited, Kawasaki, Japan

[21] Appl. No.: 789,815

[22] Filed: Nov. 12, 1991

Related U.S. Application Data

[63] Continuation of Ser. No. 716,925, Jun. 18, 1991.

[30] Foreign Application Priority Data

Jun. 18, 1990 [JP] Japan ............................. 2-157706

[51] Int. Cl.$^5$ ............................................. H05K 7/20
[52] U.S. Cl. ............................. 361/384; 361/386; 361/428; 361/379
[58] Field of Search ............... 174/68.3, 100; 361/380, 361/383, 384, 386–389, 428, 379

[56] References Cited

U.S. PATENT DOCUMENTS

4,519,013  5/1985  Breeze et al. ..................... 361/384

Primary Examiner—Gregory D. Thompson
Attorney, Agent, or Firm—Staas & Halsey

[57] ABSTRACT

A cabinet for housing electrical components therein, including a horizontal passage (42) for ventilation extending crosswise horizontally through a ceiling portion of the cabinet, a ventilation unit (43) allowing air to enter the horizontal passage (42), and a partition separating the horizontal passage (42) from the cabinet interior (44). A thermal conductive unit (1) is fitted in the partition such that it is disposed partially in the horizontal passage (42) and partially in the cabinet interior (44), and conducts heat generated by the electrical component to the horizontal passage (42), and at least one cable support is provided on the thermal conductive unit (1), for receiving cables in the cabinet interior (44).

6 Claims, 11 Drawing Sheets

CABINET FOR HOUSING ELECTRICAL COMPONENTS

This application is a continuation of application Ser. No. 07/716,925, filed Jun. 18, 1991, now abandoned.

BACKGROUND OF THE INVENTION

1. Field of the Invention

The present invention relates to a cabinet for housing electrical components.

2 Description of the Related Art

Figure 9:
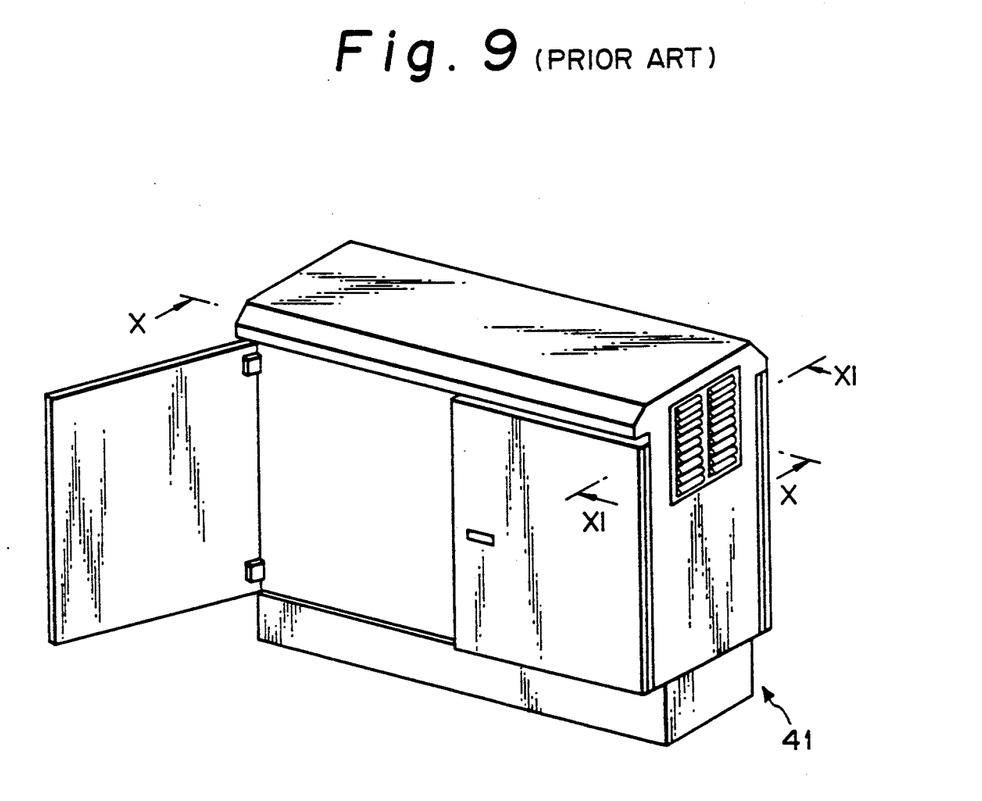
FIG. 9 is a perspective view showing an outline of the conventional cabinet.
Figure 10:
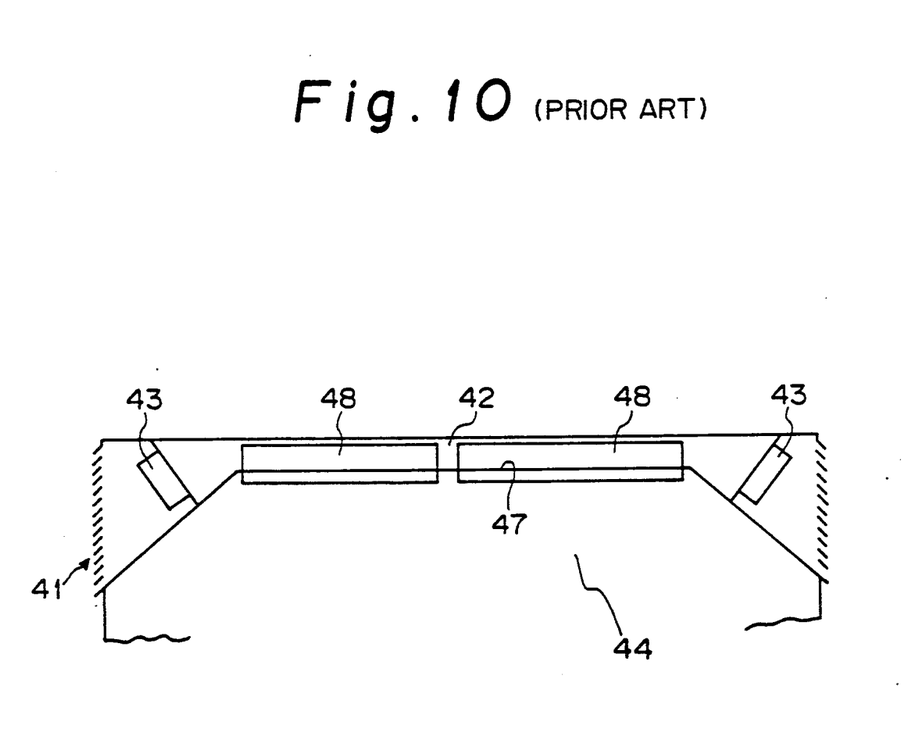
FIG. 10 is a front sectional view showing a key portion taken in a plane along line 10—10 in FIG. 9.

FIGS. 9 through 10 show an embodiment of an all-weather type cabinet, which is similar to that disclosed in detail in U.S. Pat. No. 4,949,218 in the name of the present applicant, enclosing therein electrical components, such as communication equipment, in such a way that two apparently opposite requirements are met, respectively, for an enclosed construction wherein the communication equipment is not subject to direct exposure to rain and other weather, and an open construction wherein there is provided a passage for releasing heat to the exterior.

Figure 11:
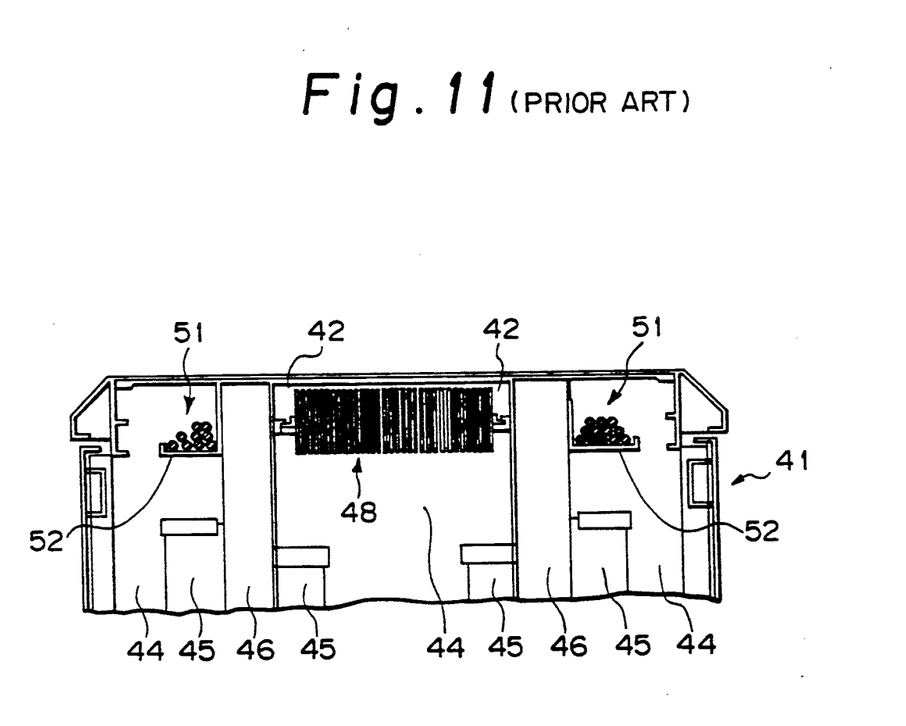
FIG. 11 is a side sectional view showing a key portion taken in a plane; along line 11—11 in FIG. 9.

FIG. 9 is a perspective view showing the entire cabinet, FIG. 10 is a front sectional view of a pertinent part of the cabinet taken in a plane along line 10—10 in FIG. 9, and FIG. 11 is a lateral side sectional view of the pertinent part of the cabinet taken in a plane along line 11—11 in FIG. 9.

As shown in these figures, a horizontal passage is formed for ventilation, extending crosswise (widthwise of the cabinet) and horizontally through a ceiling portion 41a of the cabinet 41, and which encloses therein communication equipment 45. At each end of the horizontal passage 42 there is installed a cooling fan 43 (ventilation means) which forcibly draws in outside air through a vent 43a at one end of the horizontal passage 42, delivers the air therethrough, and exhausts said delivered air to the exterior through a vent 43b at the other end thereof.

The horizontal passage 42 of the ceiling portion 41a and the cabinet interior housing portion 44, the latter holding communication equipment 45, are partitioned from each other by partition 41', whereby moisture, dust and dirt, etc., contained in air flowing through the horizontal passage 42 are prevented from entering the cabinet interior housing portion 44. At respective key points of the cabinet interior housing portion 44 there are furnished posts 46, each of which is vertically arranged as a base, or support, on which a respective part of the communication equipment 45 is supported.

The partition 41', which separates the horizontal passage 42 of the ceiling portion 41a and the cabinet interior housing portion 44, includes a part 47 which extends along the direction of the air flow inside the horizontal passage 42 and has a plurality of fins 48 (of a thermal conductive material) extending therethrough. These cooling fins 48 have a configuration of a large number of vertically oriented flat fins extending horizontally, crosswise of the cabinet and through the part 47 of the partition, and thus parallel to the horizontal passage 42; further, the fins are joined at the centers thereof. The upper parts of these fins, defined in reference to the centers thereof at which the fins are joined together, extend upwardly within the horizontal passage 42 of the ceiling portion 41a, and the lower parts thereof extend downwardly within the cabinet interior housing portion 44.

The cooling fins 48 are configured such that air, moving upward as it is heated by heat radiated by the communication equipment during operation, is cooled (heat absorption) by the lower parts of the cooling fins 48 and descends toward the lower parts thereof, with the removed heat subsequently being radiated (i.e., the heat is exhausted) by the fin upper parts into the cool air flowing inside the horizontal passage 42 and exhausted by the air flow to the exterior. This continual heat transfer from the cabinet interior to the horizontal passage 42, due to the heat absorption and heat radiation by the cooling fins 48, effectively cools the cabinet interior 44.

From the viewpoint of accident prevention and safety, it is dangerous to lay, at a lower part of the cabinet interior, a variety of cables 51 used for electrical connections between equipment 45 within the cabinet housing portion 44 and exterior devices, and thus L-shaped channels 52 are formed from sheet metal and mounted at the upper part of each post 46, to carry the cables 51 and thereby safely house them within the cabinet, as shown in FIG. 11.

Nevertheless, when the above-disclosed cooling mechanism, which effectively cools the cabinet interior housing portion 44 with the cooling fins 48, is used, heated air accumulates in an upper space in the cabinet, as in the prior art, and thus cables 51 laid in the upper part of the cabinet interior housing portion 44, without thermal protection, inevitably are thermally affected. In addition since there may be some power cables, etc. among these cables, each carrying a large current and generating heat, it is likely that the cable jackets would be damaged during long term use.

SUMMARY OF THE INVENTION

The primary object of the present invention is, therefore, to provide a communication equipment-containing cabinet which is capable of effectively solving the above thermal problems inevitably arising in conventional cabinets, while housing cables in a limited space in the cabinet in substantially the same way as in the prior art.

To achieve the above object, according to the present invention, there is provided a cabinet for housing electrical components, including a ceiling portion defining a horizontal passage for ventilation which extends crosswise (i.e., widthwise) horizontally through a ceiling portion of the cabinet, ventilation means for allowing air to enter the horizontal passage, and a partition separating the horizontal passage of the ceiling portion from an equipment housing portion of the cabinet interior, and further, there is provided a thermal conductive means fitted in the partition so that it is disposed partially in the horizontal passage and partially in the cabinet interior housing portion, for conducting heat generated by the electronic equipment to the horizontal passage, characterized in that there is provided at least one cable support portion on the thermal conductive means, for receiving cables in the cabinet interior housing portion.

With this arrangement, the cables are not only effectively protected against thermal damage within the cabinet, through thermal shielding provided by a rack for receiving the cables, but also are ensured of a direct release of self-generated heat, by air currents flowing therethrough into the horizontal passage via a thermal transfer through the thermal conductive means forming said rack, with the result that the durability of the cables is remarkably improved.

DESCRIPTION OF THE PREFERRED EMBODIMENTS

Preferred embodiments of the present invention are described hereunder with reference to the drawings attached hereto. Parts identical to those parts in the above conventional cabinet are given the same reference numbers, and thus a description thereof is omitted, and only parts characteristic of the present invention are described hereunder.

Figure 1:
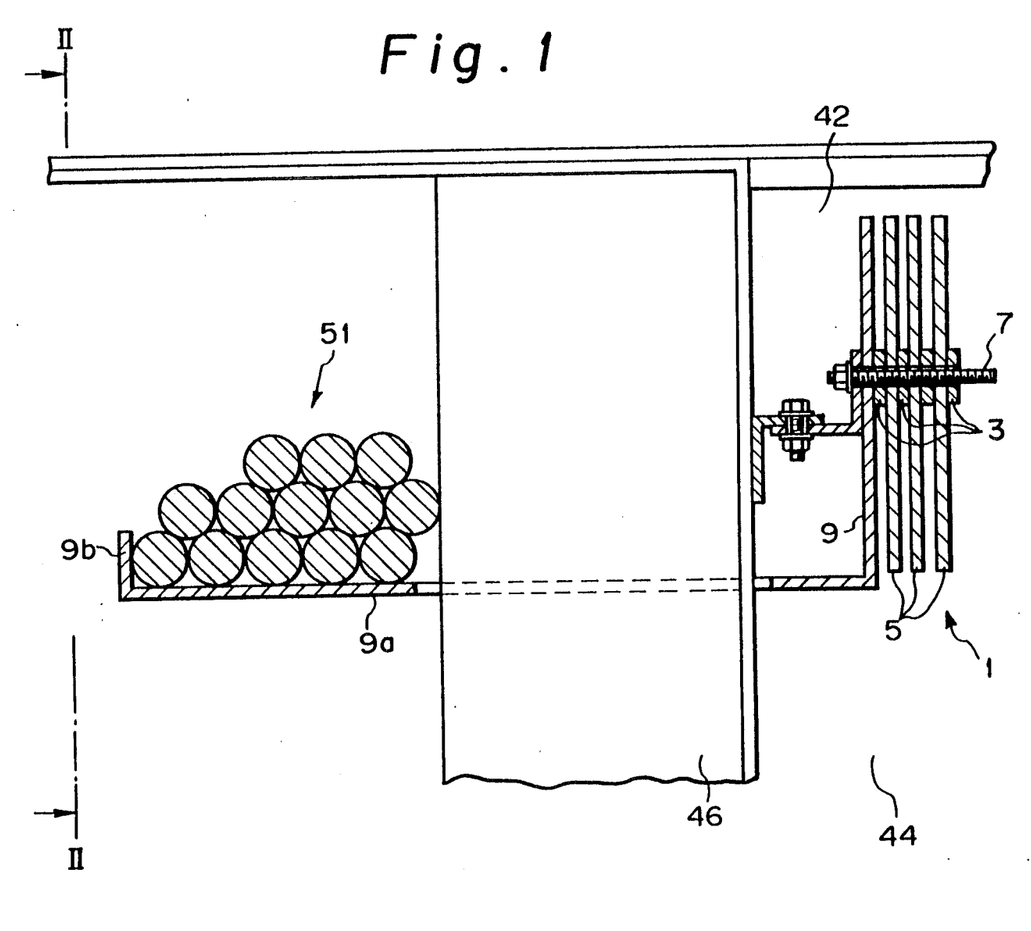
FIG. 1 is a side sectional view showing a key portion of a cable retaining part of one embodiment of a cabinet for housing communication equipment, according to the present invention.
Figure 2:
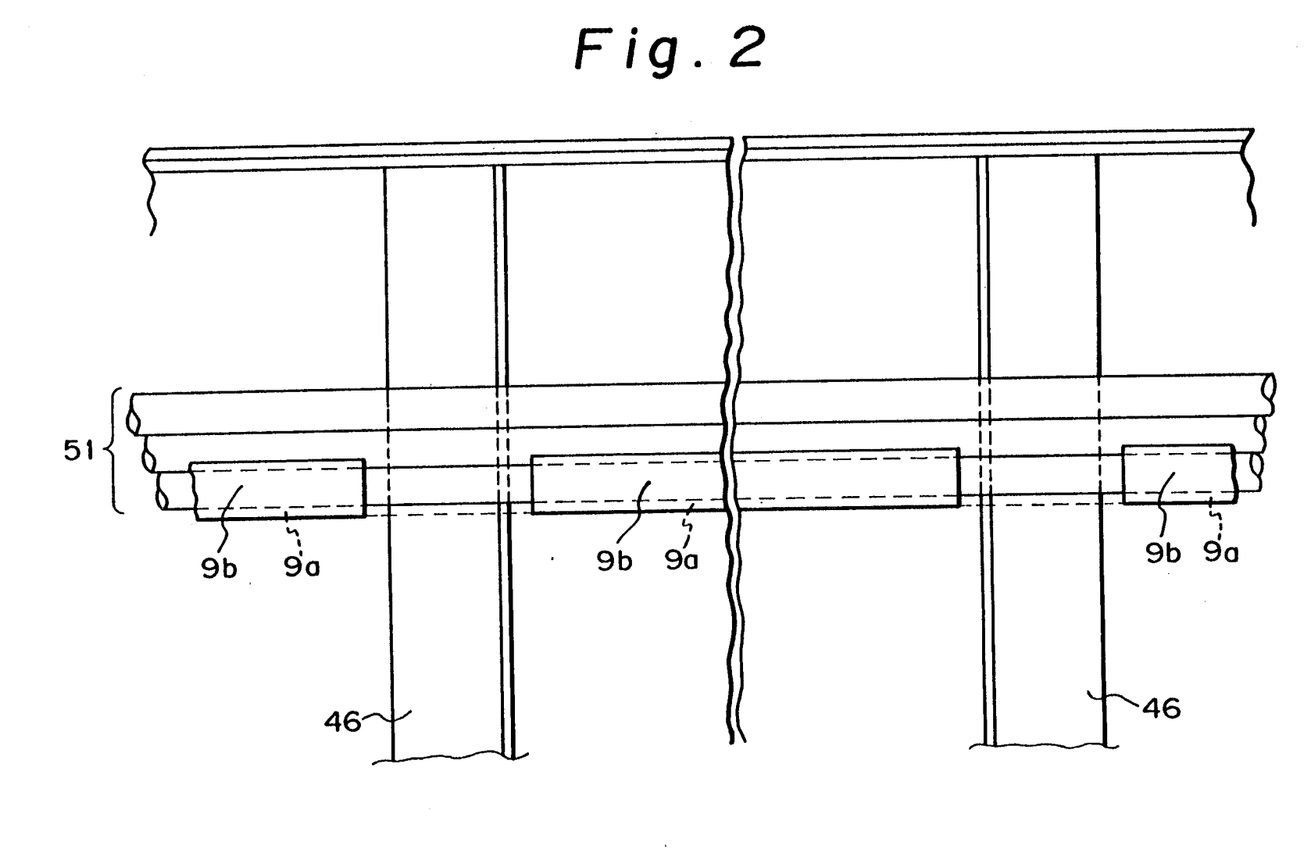
FIG. 2 is a front sectional view taken in a plane along line 2—2 in FIG. 1.

FIG. 1 is a side sectional expanded view showing a key area of the cable retaining portion in one embodiment of the cabinet of the present invention for housing communication equipment, and FIG. 2 is a front sectional view taken in a plane along line 2—2 in FIG. 1.

Referring to these figures, a cooling fin assembly 1 (thermal conductive member) is provided for affording heat transfer from a cabinet interior housing portion 44 to a horizontal passage 42 of a ceiling portion 41a, which basically has a configuration such that a large number of plural, flat fins 5, serially arranged in parallel and with a spacer provided between adjacent fins, are joined by a coupler member (bolt) 7 centrally inserted through said serially arranged, parallel flat fins. It should be noted that a leftmost fin 9 has a different configuration relatively to the remaining fins 5, i.e., has an L-shaped channel structure. An L-shaped part 9a of the leftmost fin 9 extending horizontally and laterally between posts 46 functions as a rack or a holder for retaining cables 51. The fin part 9a has a side wall (i.e., vertical edge) portion 9b provided at an end of the fin 9, rising vertically to a height sufficient to prevent the cables from falling out. Compared with the remaining flat fins, the fin 9 has a relatively complex sectional profile; nevertheless, the fin 9 is made by extrusion pressing, using aluminum, in the same way as the remaining fins 5.

As mentioned above, a part of the cooling fin assembly 1 is extended to form a rack fin part 9a for retaining the cables thereon. Therefore, unlike the case wherein an independent rack structure (similar to a conventional L-shaped fixture 52 provided only to hold cables), the fin part 9a is structurally capable of functioning as a heat shield, with the cables effectively thermally protected against heat transferred upward within [a] the cabinet interior housing portion 44. Further, the fin part 9a, by retaining the cables thereon, is in a thermally conductive relationship with said cables due to the contact maintained therewith and serves to directly transfer the heat generated in these cables to the vertical part of fin 9 within the air passage 42 and through which air currents flow, and for subsequent release of the heat to the exterior, whereby a rise of the temperature of the entirety of cables 51 is remarkably lessened. The cooling effect as explained above results in greatly improved durability, etc. of the cables in the cabinet interior housing portion, and accordingly, an improvement of the reliability of the communication equipment.

Figure 3:
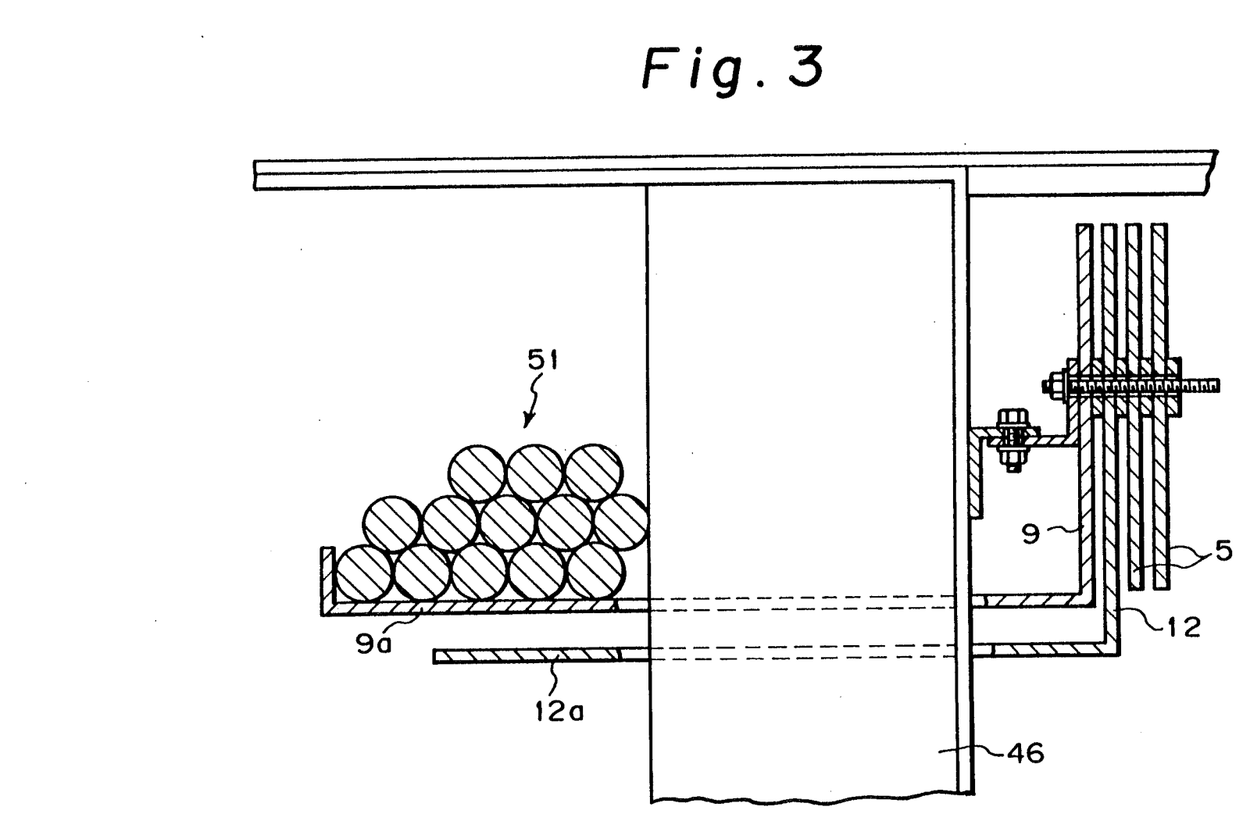
FIG. 3 is a side sectional view showing a key portion of another embodiment according to the present invention.

An alternate fin assembly configuration shown in FIG. 3 has a fin part 12a which extends horizontally and laterally from an additional L-sectional shaped fin 12, which physically shields the fin part 9a from below, and thus further thermally shields the cables.

Figure 4:
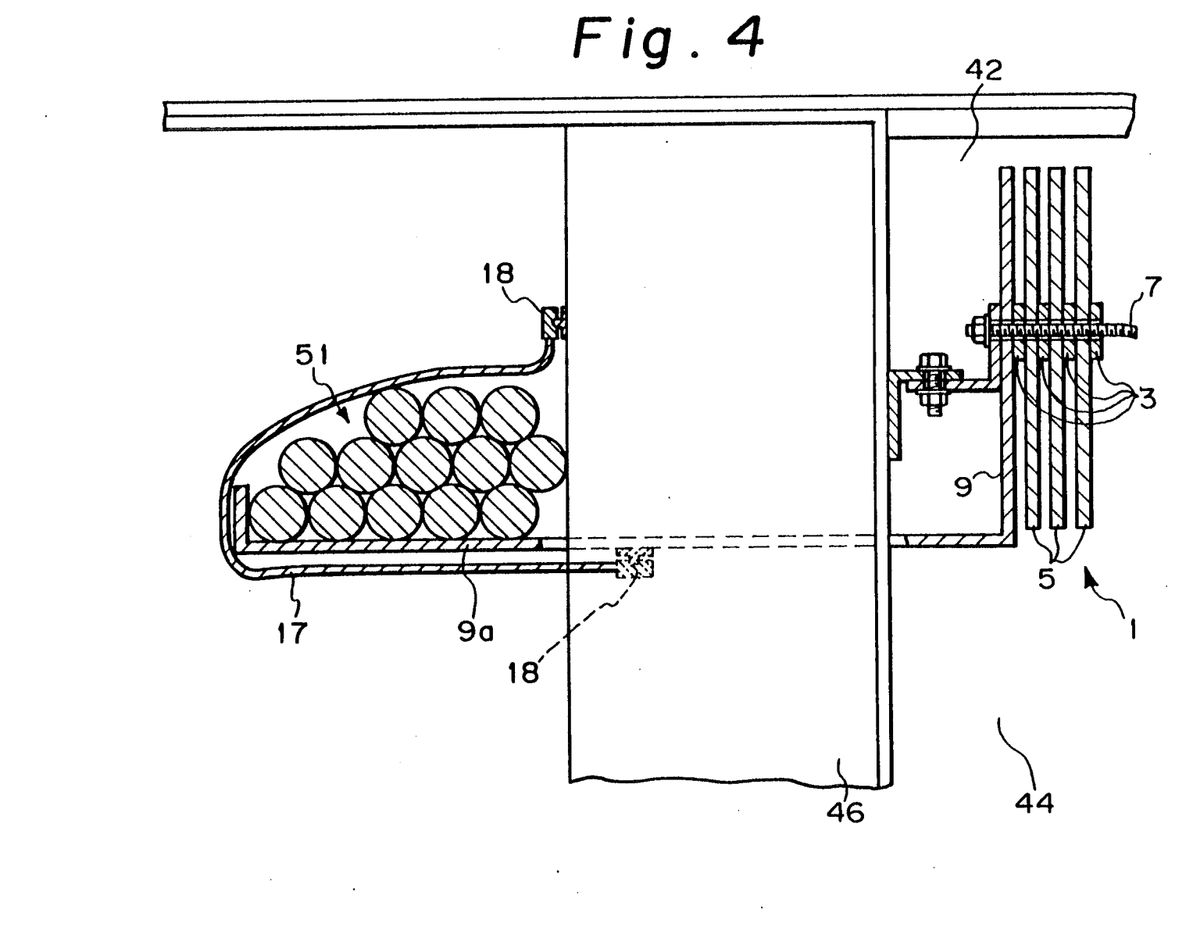
FIG. 4 is a side sectional view showing a key portion of a further embodiment according to the present invention.

Alternatively, as shown in FIG. 4, there may be provided at least one cover 17 made of an adiabatic material, e.g., foamed plastic. The cover 17 is secured to the fin part 9a at one end thereof and to the post (posts) 46 at the other end thereof, with hook members 18, and, accordingly, the cables 51 are effectively thermally shielded.

Figure 5:
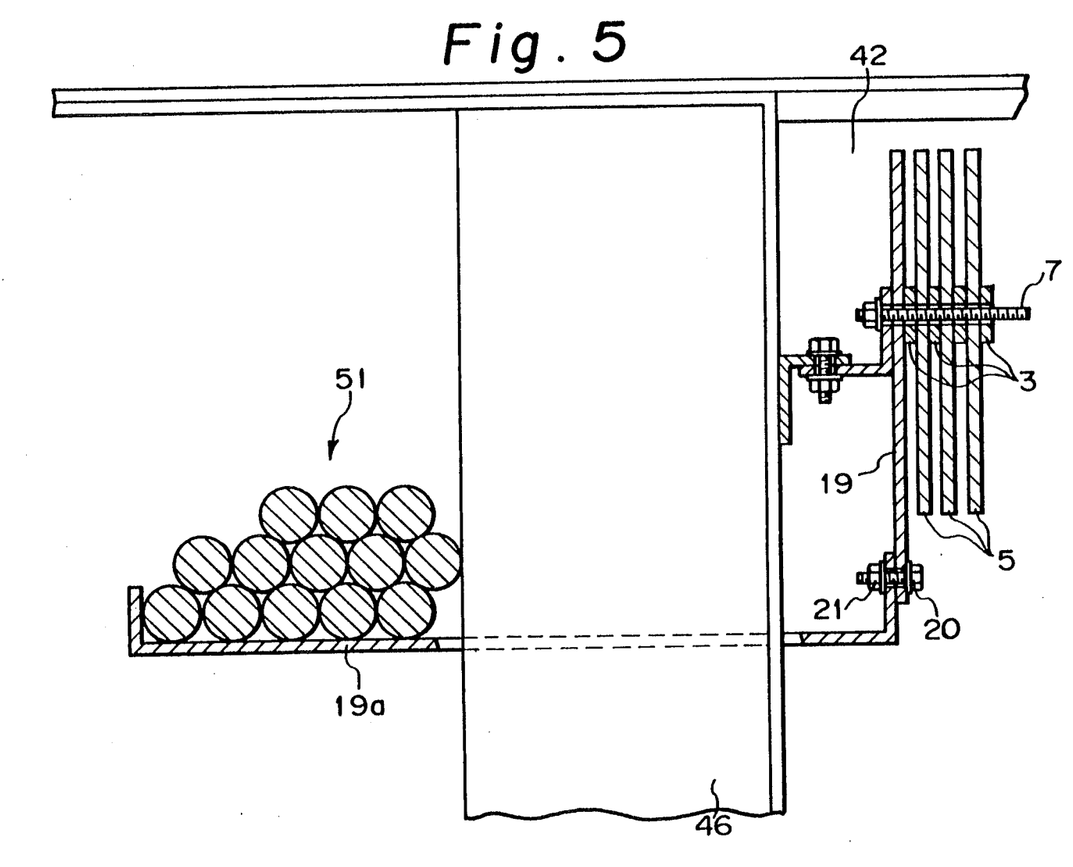
FIG. 5 is a side sectional view showing a key portion of yet another embodiment according to the present invention.

Instead of forming the L-shaped fin 9 of FIG. 1 as one body, it can be designed such that a C-shaped heat-transferable member 19a is attached to a leftmost flat fin 19 with a bolt 20 and a nut 21, as shown in FIG. 5.

Figure 6:
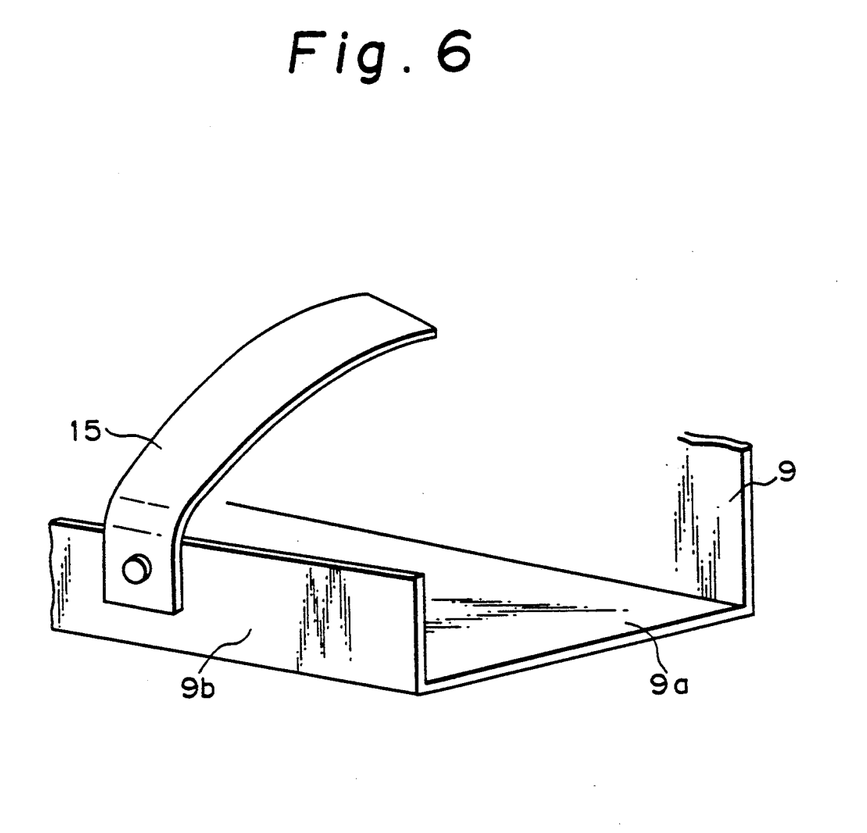
FIG. 6 is a perspective view of a cable retainer strip secured to the cable retaining part.

It is preferable, from the standpoint of securing the bundle of cables 51 on the fin part 9a of a rack profile, that the cables be bound together, using a nylon band, for example (not shown). Alternatively, as shown in FIG. 6, a cable retainer strip 15 of a shape-recovery metal, e.g., a bimetal or similar materials, is secured to the side wall portion 9b such that the strip 15 is allowed to deform in one direction to thus retain the cables 51 on the fin part 9a in response to a rise in the temperature, whereby the cables 51 are held by at least the cable retainer strip 15 during the operation of the communication equipment. It is further noted that, in response to the rise in the temperature, the cable retainer strip 15 applies a downward pressure to the cables 51, to press same against the fin part 9a, whereby the contact with the bundle of cables 15 is increased, which promotes the heat transfer.

Figure 7:
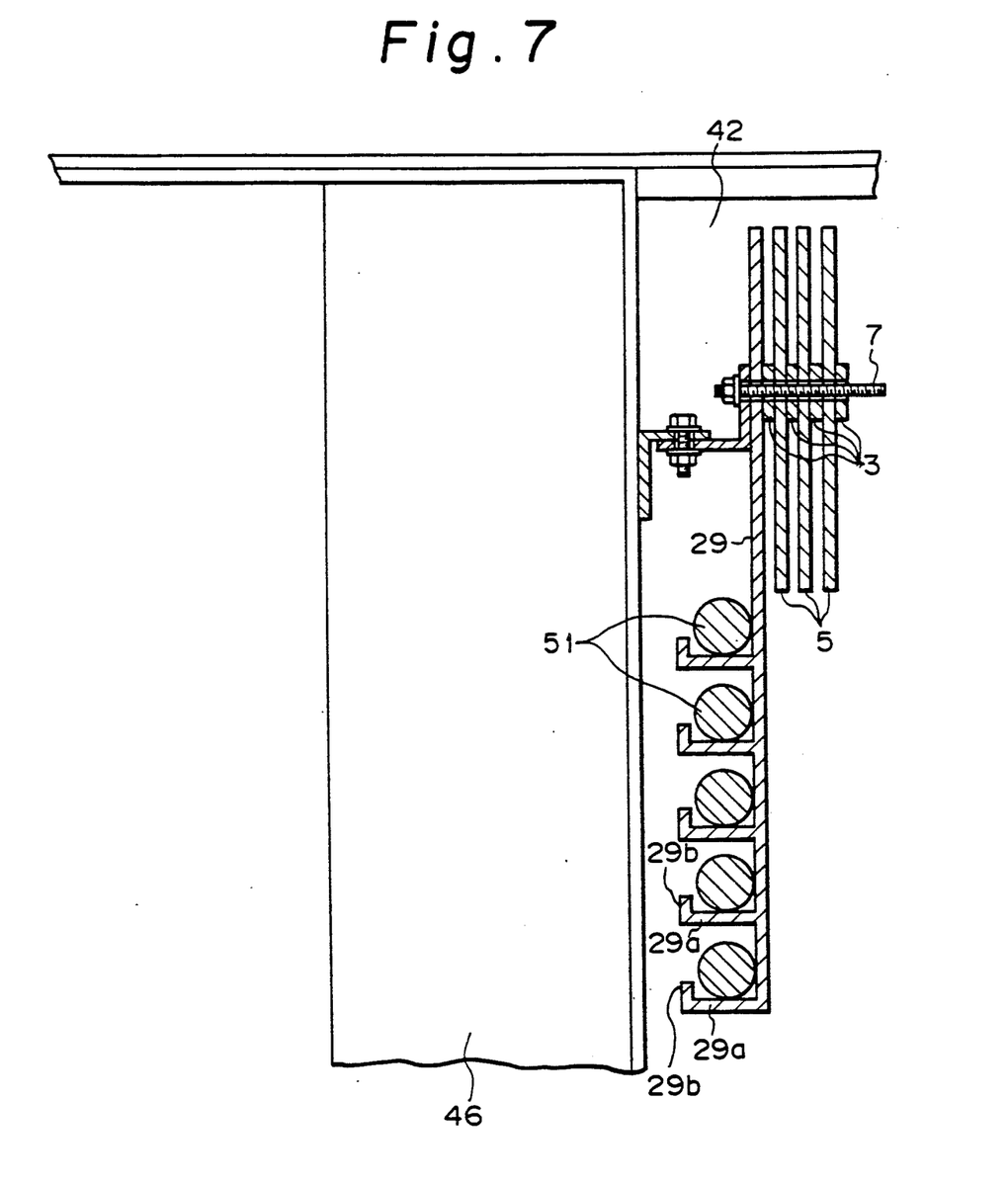
FIG. 7 is a side sectional view showing a key portion of another embodiment according to the present invention.
Figure 8:
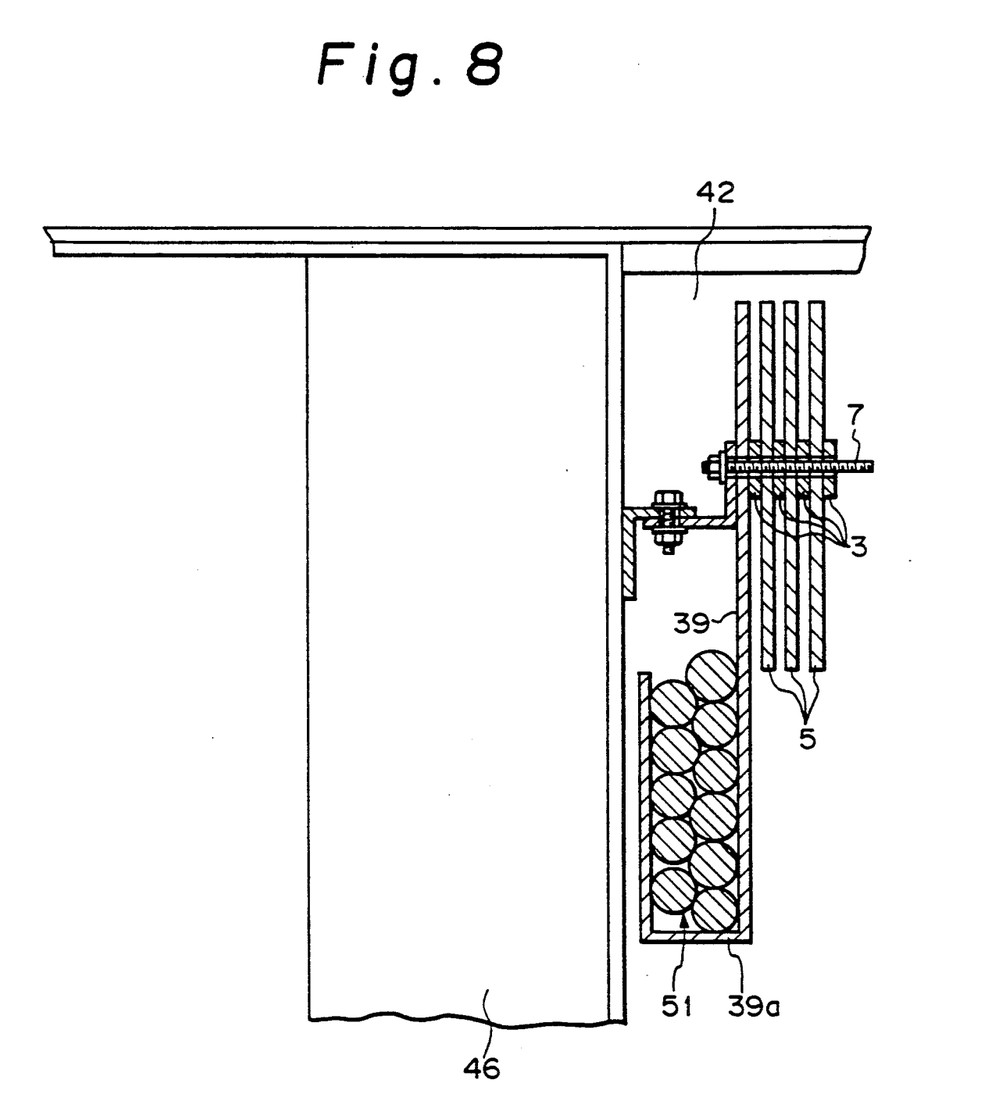
FIG. 8 is a side sectional view showing a key portion of a further embodiment according to the present invention.

Finally, the following description is of various modifications of the cable retaining arrangement, with reference to FIGS. 7 and 8.

The leftmost fins 29 and 39 depicted in these figures are of different shapes relatively to that of FIG. 1.

In FIG. 7, the fin 29 has several parallel and mutually vertically spaced, horizontally extending fin parts 29a with respective side wall, or vertical edge, portions 29b extending vertically upwardly from the free ends thereof, such that the cables 51 may be safely retained, individually, by the respective fin parts 29a, and the heat generated in these cables 51, especially if power cables (not specified in the figure), may be transferred with a high efficiency, as previously described.

In FIG. 8, the fin 39 has a U-shaped section 39a such that the cables 51 are safely received in bulk inside the U-shaped portion 39a.

It is to be understood that the invention is by no means limited to the specific embodiments illustrated and described herein, and that various modifications thereof may be made which come within the scope of the present invention as defined in the appended claims.

We claim:

1. A cabinet having spaced end walls defining the cabinet width, front and rear walls defining the cabinet depth and a top wall, the cabinet interior including a housing portion adapted for housing electrical components therein, a ceiling portion adjacent the top wall defining a horizontal ventilation passage extending horizontally through the cabinet, widthwise of the cabinet, and a partition separating the housing portion from the ceiling portion, the passage having first and second ends open to the exterior of the cabinet at the respective, spaced end walls, and the cabinet further being adapted to receive and house electrical cables for selectively connecting the electrical components housed within the cabinet housing portion to the exterior of the cabinet, comprising:

ventilation means for producing a flow of air from the cabinet exterior, entering the horizontal ventilation passage at the first end thereof and exiting the horizontal ventilation passage at the second end thereof to the cabinet exterior;

thermal conductive means, mounted in the partition and supported thereby so as to dispose the thermal conductive means partially int eh horizontal ventilation passage of the ceiling portion and partially in the cabinet interior housing portion, for conducting heat, such as generated by the electrical components when housed and operated within the housing portion, from the housing portion to the horizontal ventilation passage of the ceiling portion; and the thermal conductive means further comprising cable supporting means, disposed within the housing portion and having a cable supporting surface, for receiving and thereby supporting cables on the cable supporting surface thereof and thus within the housing portion, the thermal conductive means being adapted to deflect heat, such as generated by the electrical components when housed and operated within the housing portion, from the cable supporting surface thereof and thus from the cables when received and supported thereon, and to conduc heat, such as transmitted thereto from the cables when received and supported on the cable supporting surface thereof, to the horizontal ventilation passage.

2. A cabinet according o claim 1, wherein said thermal conductive means comprises a cooling fin mounted in and supported by the partition and having an upper portion disposed in the horizontal ventilation passage and a lower portion disposed in the housing portion.

3. A cabinet according to claim 1, wherein:
said cable supporting surface of said cable supporting means, of said thermal conductive means, extends horizontally and widthwise of the cabinet.

4. A cabinet according to claim 1, wherein:
said thermal conductive means comprises a cooling fin assembly of plural cooling fins; and
said cable supporting means comprises a cooling fin of said cooling fin assembly.

5. A cabinet according to claim 4, wherein said cable supporting cooling fin comprises a horizontal rack which extends in a first direction horizontally and widthwise of the cabinet and in a second direction transverse to the first direction and thereby defines the cable supporting surface.

6. A cabinet according to claim 5, wherein said horizontal rack of said cable support cooling fin has a vertical edge portion extending upwardly from the cable supporting surface along the widthwise, free edge of the horizontal rack, for securely holding cables, when received and supported on the cable supporting surface.

* * * * *

UNITED STATES PATENT AND TRADEMARK OFFICE
CERTIFICATE OF CORRECTION

PATENT NO. : 5,138,522
DATED : August 11, 1992
INVENTOR(S) : Yasushi KOJIMA et al.

It is certified that error appears in the above-indentified patent and that said Letters Patent is hereby corrected as shown below:

TITLE PAGE: [57] ABSTRACT, lines 10-11, change "component" to --components--.

Col. 5, line 35, change "int eh" to --in the--.

Col. 6, lines 11-12, change "conduc" to --conduct--.

Signed and Sealed this

Seventh Day of June, 1994

Attest:

BRUCE LEHMAN

Attesting Officer           Commissioner of Patents and Trademarks